No. 653,774. Patented July 17, 1900.
J. C. H. KUNZ.
TIRE SETTER.
(Application filed Sept. 18, 1899.)
(No Model.) 2 Sheets—Sheet 1.
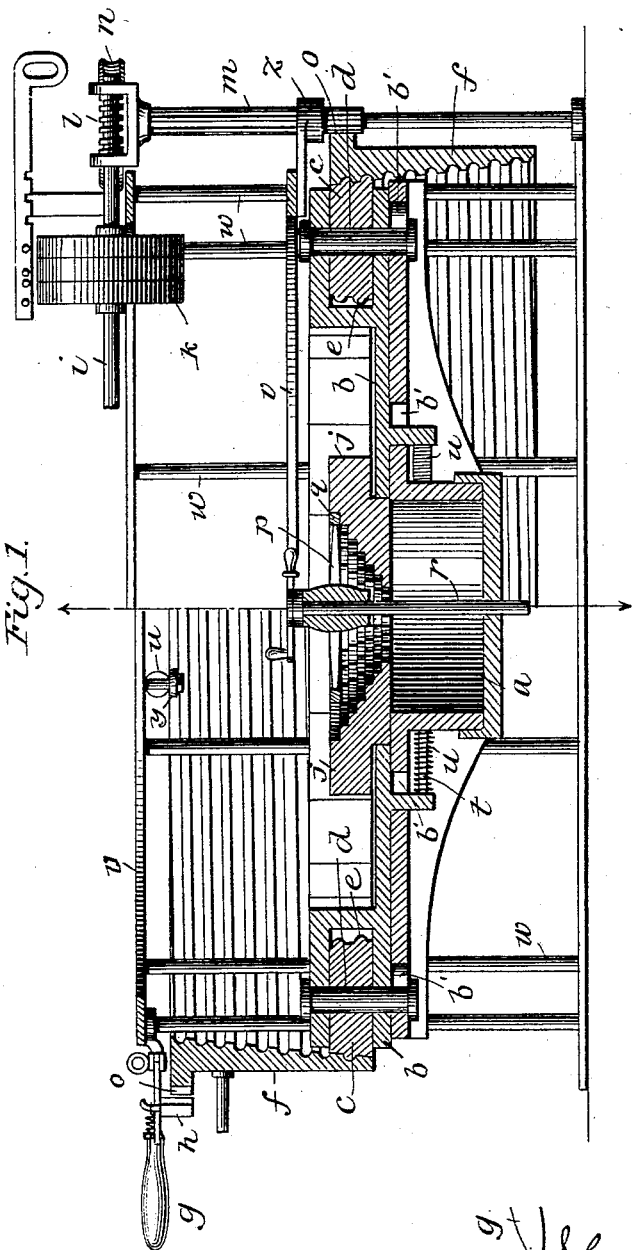
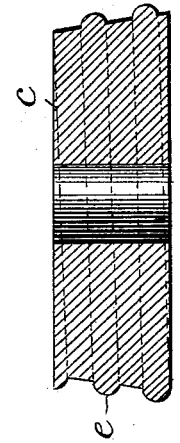
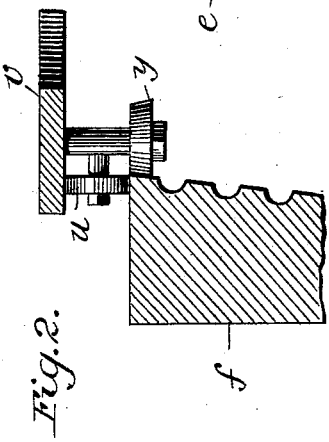

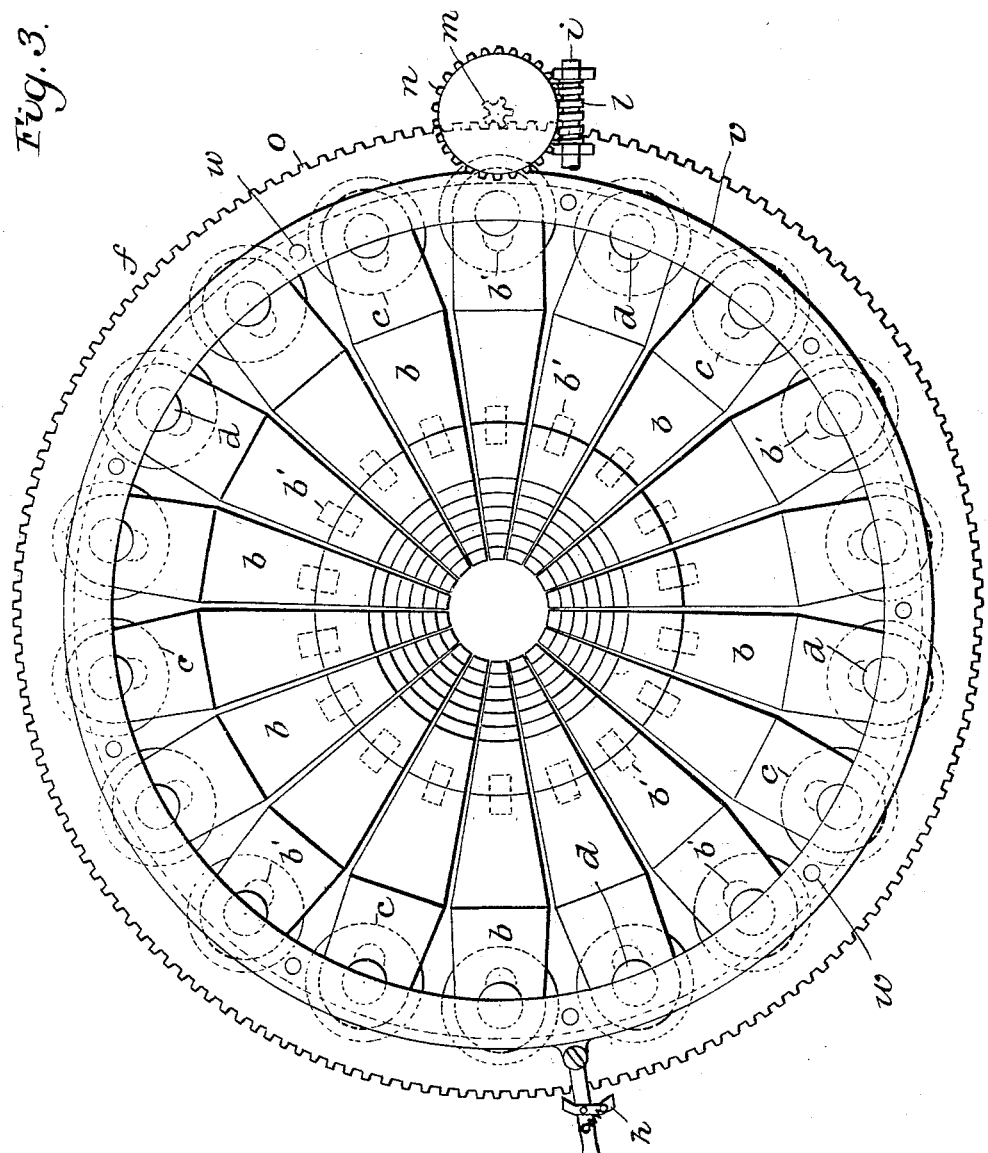

UNITED STATES PATENT OFFICE.

JOHANN CHRISTIAN HEINRICH KUNZ, OF CRONBERG, GERMANY.

TIRE-SETTER.

SPECIFICATION forming part of Letters Patent No. 653,774, dated July 17, 1900.

Application filed September 18, 1899. Serial No. 730,935. (No model.)

*To all whom it may concern:*

Be it known that I, JOHANN CHRISTIAN HEINRICH KUNZ, a subject of the Emperor of Germany, and a resident of Cronberg, near Frankfort-on-the-Main, Germany, have invented certain new and useful Improvements in Machinery for Fixing Tires onto Wheels, of which the following is a specification.

This invention relates to machines for fixing tires onto wheels, the said machines being of the class in which the tire is forced onto the wheel by concentrically-operated cheeks or jaws.

The machine constructed in accordance with the present invention has the advantage over machines as hitherto devised for the same purpose that but small power is required for securing the tire, cold, in a rapid and reliable manner, and it can be effected by hand-power.

A machine is constructed according to my invention as follows:

In the accompanying drawings, Figure 1 is a vertical longitudinal section of an apparatus embodying the invention, the parts being shown in their open and closed positions. Figs. 2 and 4 are sectional views of details. Fig. 3 is a plan of the machine.

Rigidly secured in position by braces are radiating fork-shaped roller-holders $b$, adapted to slide radially in slots $b'$. Bevel-rollers $c$ are fitted within the forks, and these are rotatable upon vertical axes $d$ and are provided with flanges $e$, which engage in a conical screw-thread in the interior of a steel casing $f$, rotatable either by machinery or by hand—for example, by means of a hand-lever $g$, fitted with a catch or pawl $h$.

Upon the ends of a shaft $i$, supported in bearings upon the frame of the machine and provided with fast and loose pulleys $k$ and a band-shifter for imparting forward or rearward motion, is a worm $l$, in gear with a worm-wheel $n$, secured on a spur-wheel $m$, which gears with teeth in the rim $o$ of the steel casing $f$, and thereby turns such casing either in one or the other direction, according to the way the driving-pulleys $k$ are set, and at the same time the said steel casing $f$, by reason of the conical surfaces of its inner screw-thread, has a rising or descending movement, as the case may be, which causes the machine either to open or to close.

The wheel $p$ to be provided with a tire $q$, and also the tire to be secured to it, are secured between jaws $j$ by means of a screw-spindle $r$, the space between the tire $q$ and the forks of the roller-holders $b$ being filled up with radial filling-pieces corresponding to the diameter of the wheel, while the inner ends of such holders serve as compressing-surfaces.

When the steel casing $f$ is screwed downward, Fig. 1, on the right hand, it will by reason of its conical shape exercise a driving or forcing action upon the tire on all sides as it rotates, its rotary motion being uniform owing to the guiding action of the rollers, which are pressed toward their outward position by springs $u$ on guiding-spindles $t$, so that the flanges $e$, projecting from the rollers $c$, are maintained in the grooves of the screw-thread within the steel casing.

Upon the steel casing $f$ rests a hoop $v$, Figs. 1, 2, and 3, having apertures by means of which it is moved up and down on guiding-standards $w$, screwed to the bed-plate $a$. The object of this hoop $v$ is to maintain the steel casing $f$ in the proper position by means of vertical and horizontal rollers $x$ and $y$, Fig. 2, arranged at intervals on the said hoop, so as to prevent its being displaced by the pressure of the hand-lever $g$ or the spur-wheel $m$. To this end both the central bearing $z$ of the spur-wheel $m$ and the hinge of the hand-lever $g$ are firmly connected with the said loop $v$.

I claim—

1. In a machine for fixing tires upon wheels, the combination of a support for the wheel, a series of concentrically-acting jaws, a rotary casing having an inner conical screw-threaded surface, rollers having flanges adapted to engage with the threads of the casing and connections between the rollers and jaws, substantially as described.

2. In a machine for fixing tires upon wheels, the combination of a support for the wheel, a series of concentrically-acting stepped jaws, a rotary casing having an inner conical screw-threaded surface, rollers having flanges adapted to engage with the threads of the casing and connections between the rollers and jaws, substantially as described.

3. In a machine for fixing tires upon wheels, the combination of a support for the wheel, a series of concentrically-acting jaws, a rotary and vertically-moving casing having an inner conical screw-threaded surface and a toothed outer surface, bevel-rollers having flanges adapted to engage with the threads of the casing, connections between the rollers and jaws, and means engaging the toothed surface of the casing for rotating the same, substantially as described.

In testimony whereof I have signed my name to this specification in the presence of two subscribing witnesses.

JOHANN CHRISTIAN HEINRICH KUNZ.

Witnesses:
SIMON W. HANAUER,
MICHAEL VOLK.